No. 844,207. PATENTED FEB. 12, 1907.
R. F. STALEY.
THEATRICAL APPARATUS.
APPLICATION FILED FEB. 1, 1906.

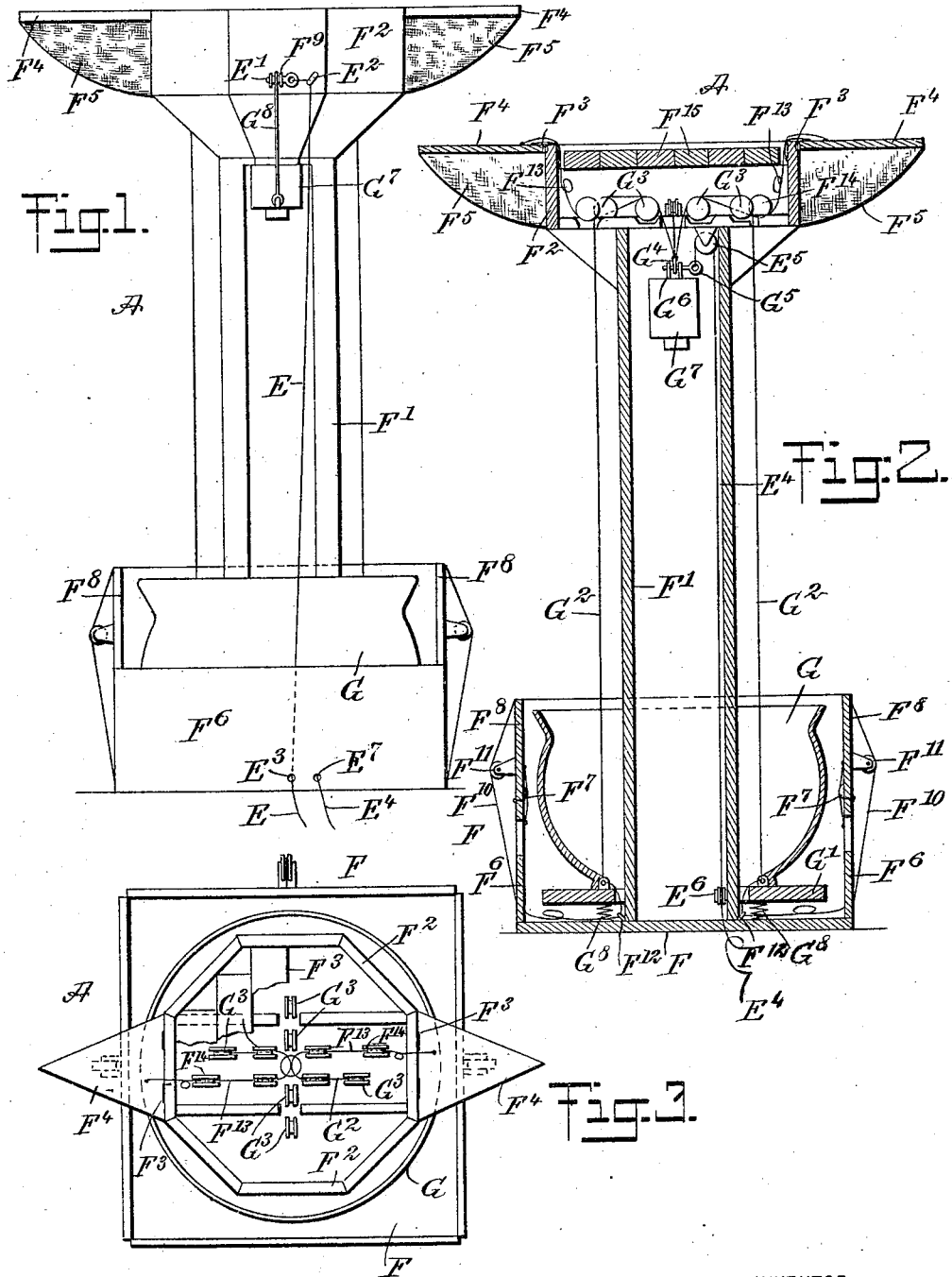

6 SHEETS—SHEET 2.

WITNESSES:

INVENTOR
Richard Felix Staley
BY
Munn & Co
ATTORNEYS

No. 844,207. PATENTED FEB. 12, 1907.
R. F. STALEY.
THEATRICAL APPARATUS.
APPLICATION FILED FEB. 1, 1906.

6 SHEETS—SHEET 3.

WITNESSES:
Fred. Dibelius

INVENTOR
Richard Felix Staley
BY
ATTORNEYS

No. 844,207. PATENTED FEB. 12, 1907.
R. F. STALEY.
THEATRICAL APPARATUS.
APPLICATION FILED FEB. 1, 1906.
6 SHEETS—SHEET 4.
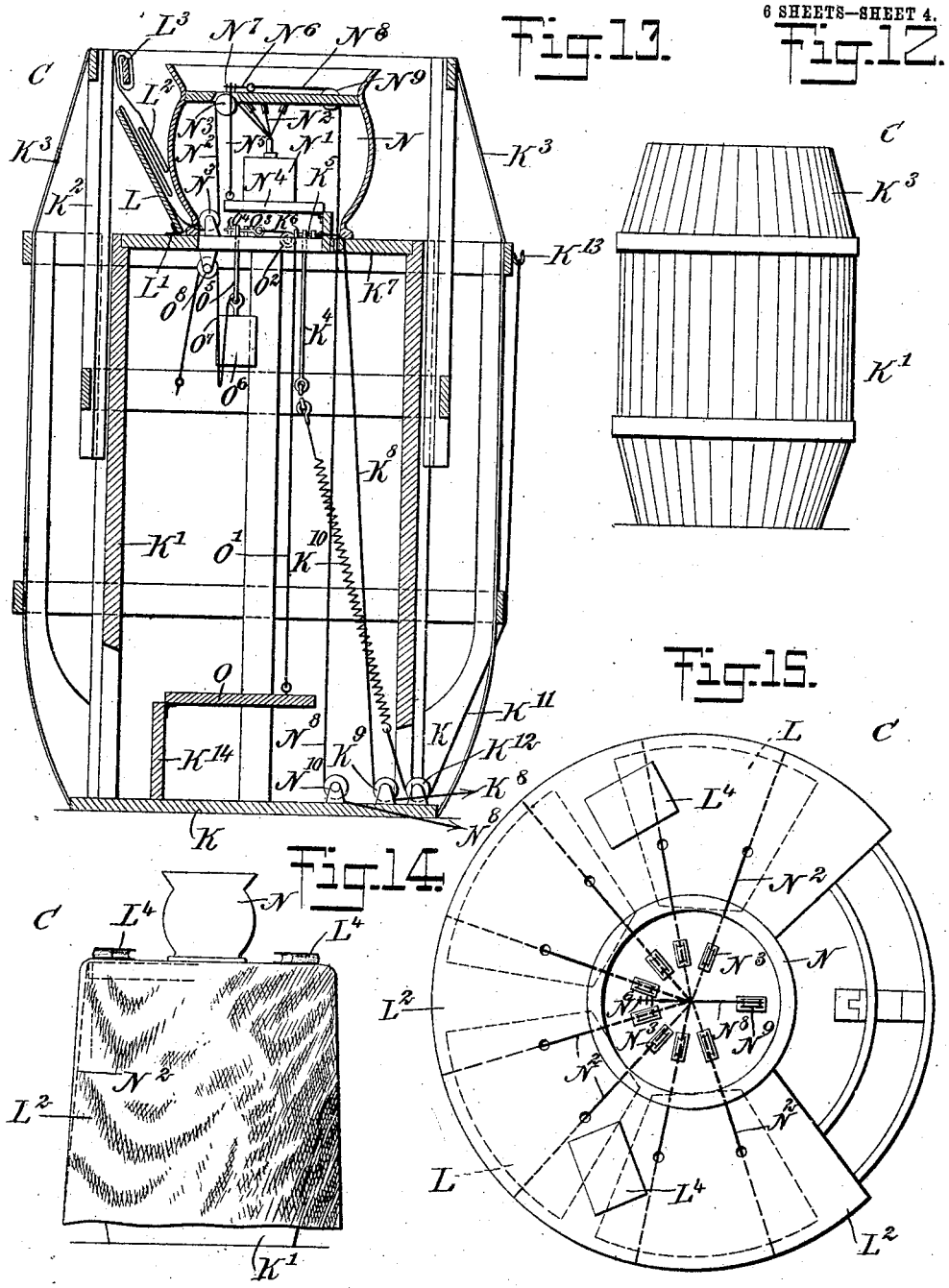

No. 844,207. PATENTED FEB. 12, 1907.
R. F. STALEY.
THEATRICAL APPARATUS.
APPLICATION FILED FEB. 1, 1906.
6 SHEETS—SHEET 5.
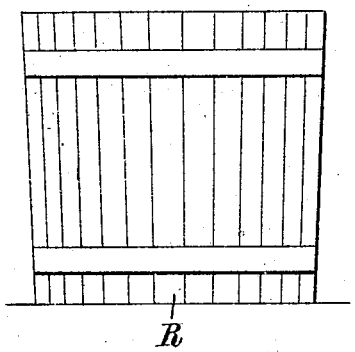
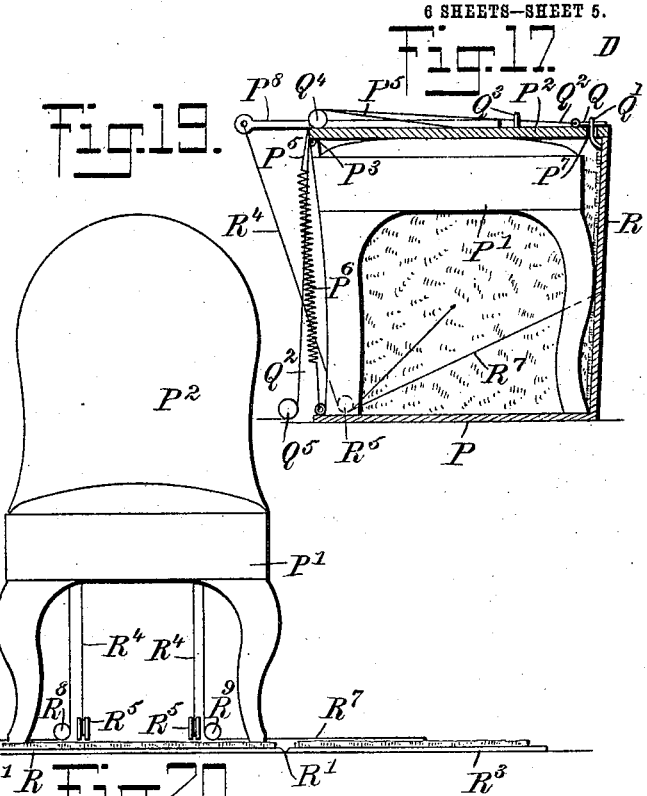
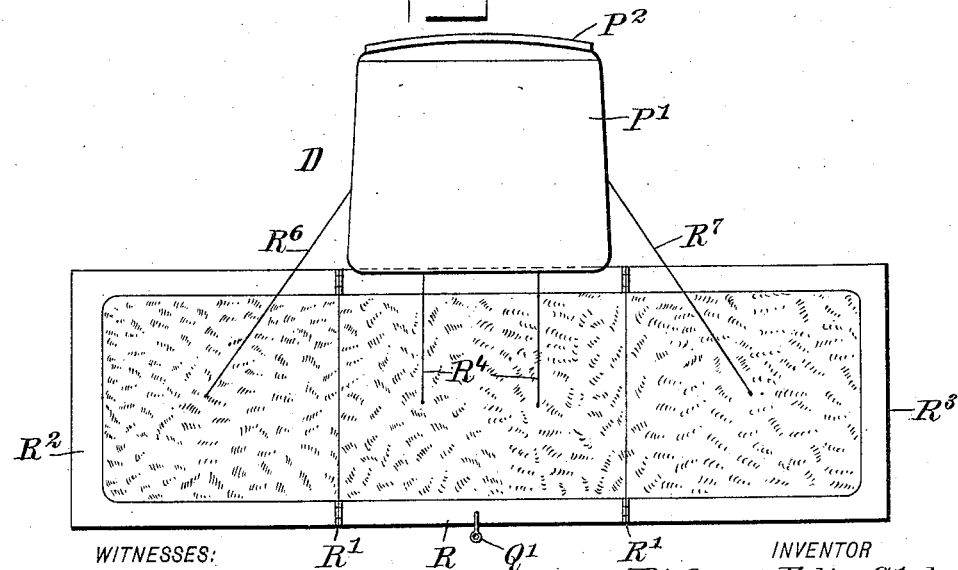
WITNESSES:
INVENTOR
Richard Felix Staley
BY
ATTORNEYS No. 844,207. PATENTED FEB. 12, 1907.
R. F. STALEY.
THEATRICAL APPARATUS.
APPLICATION FILED FEB. 1, 1906.
6 SHEETS—SHEET 6.
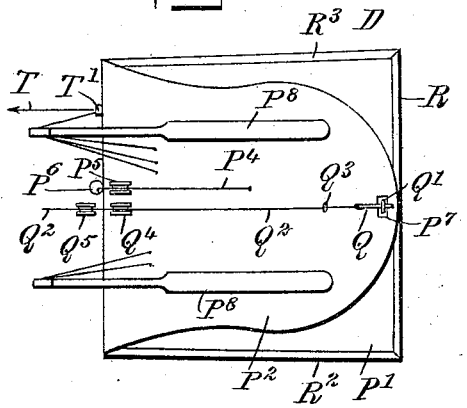
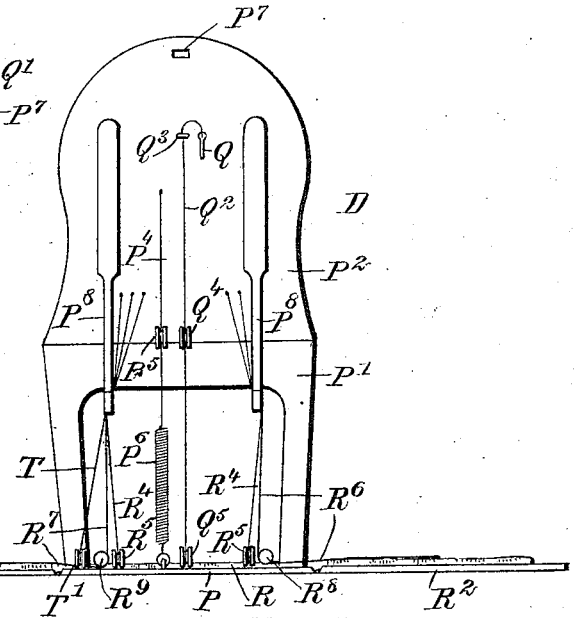
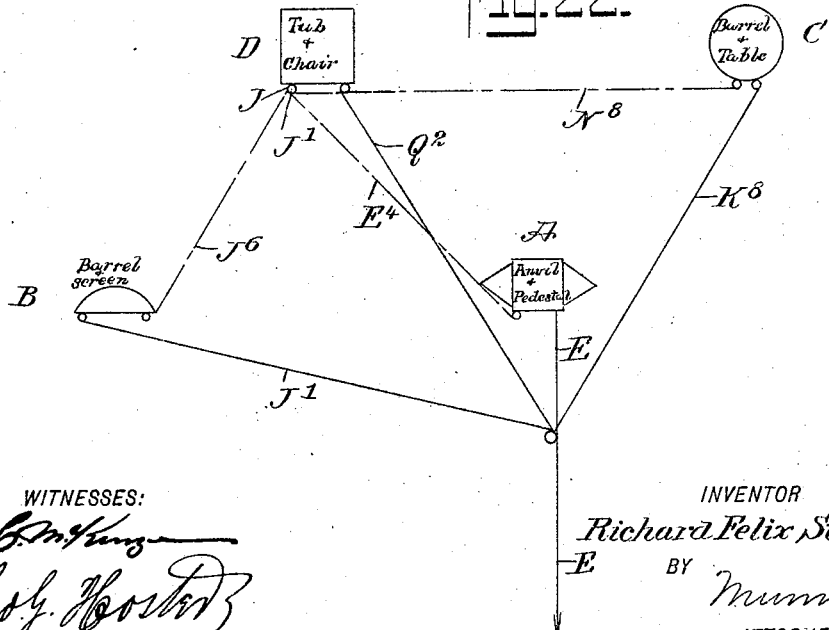
WITNESSES:
INVENTOR
Richard Felix Staley
BY
ATTORNEYS

UNITED STATES PATENT OFFICE.

RICHARD FELIX STALEY, OF ROCHESTER, NEW YORK.

THEATRICAL APPARATUS.

No. 844,207.  Specification of Letters Patent.  Patented Feb. 12, 1907.

Application filed February 1, 1906. Serial No. 298,936.

*To all whom it may concern:*

Be it known that I, RICHARD FELIX STALEY, a citizen of the United States, and a resident of Rochester, in the county of Monroe and State of New York, have invented new and useful Improvements in Theatrical Apparatus, of which the following is a full, clear, and exact description.

The object of the invention is to provide certain new and useful improvements in theatrical apparatus whereby a group of stage properties representing a set of articles belonging to one scene may be almost instantly transformed to a set of different articles belonging to an entirely different scene—for instance, changing a scene representing a cooper-shop to one representing the interior of a room—the transformation taking place without changing the position of the properties on the stage.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 4:
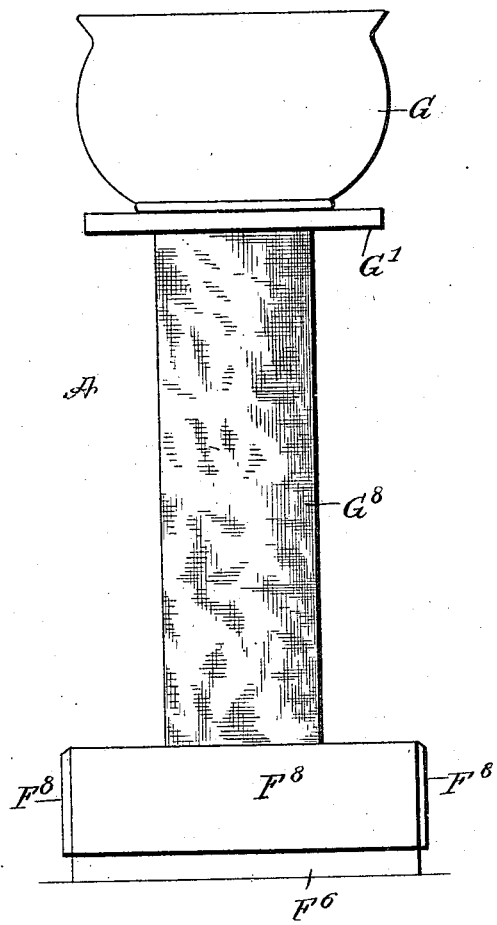
Figure 5:
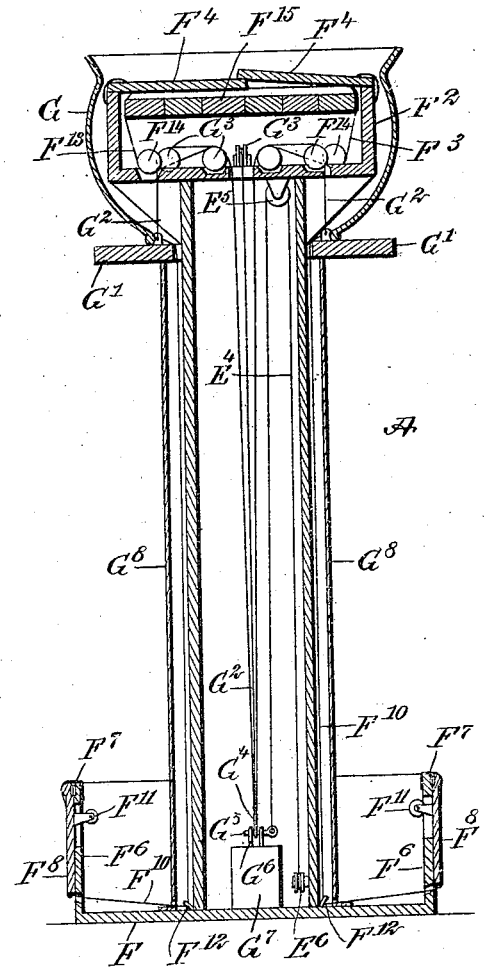
Figure 6:
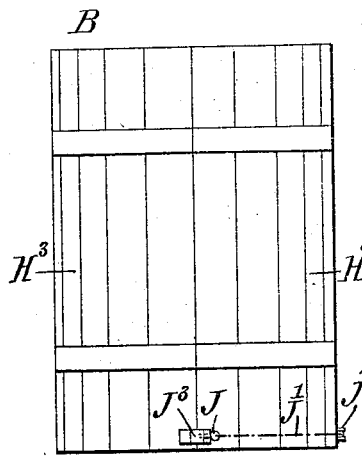
Figure 9:
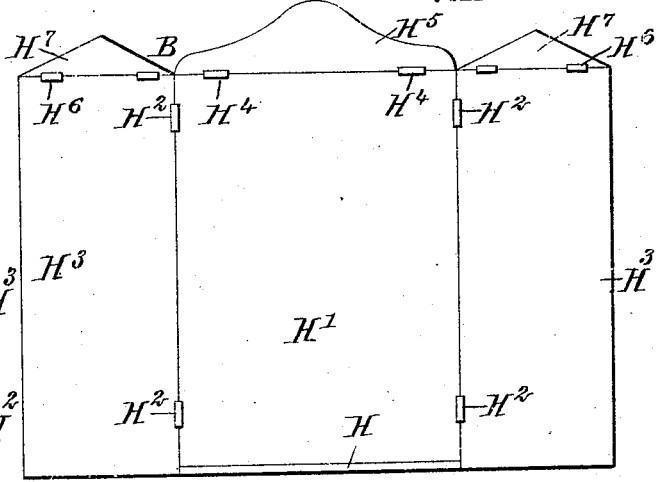
Figures 7, 10:
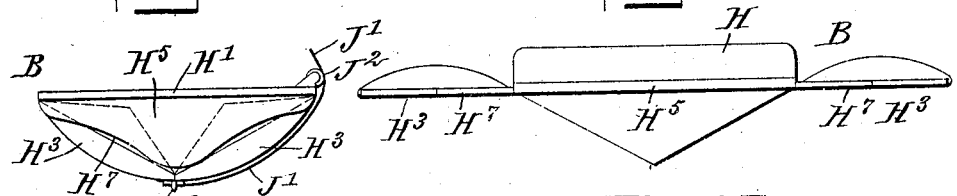
Figure 8:
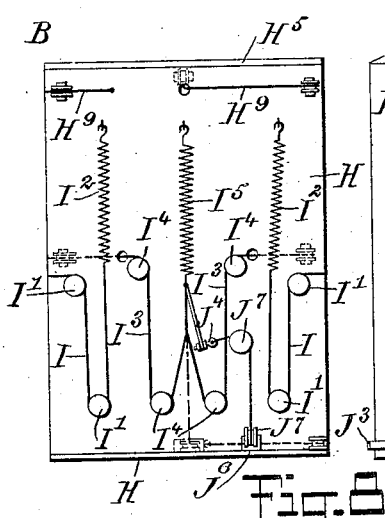
Figure 11:
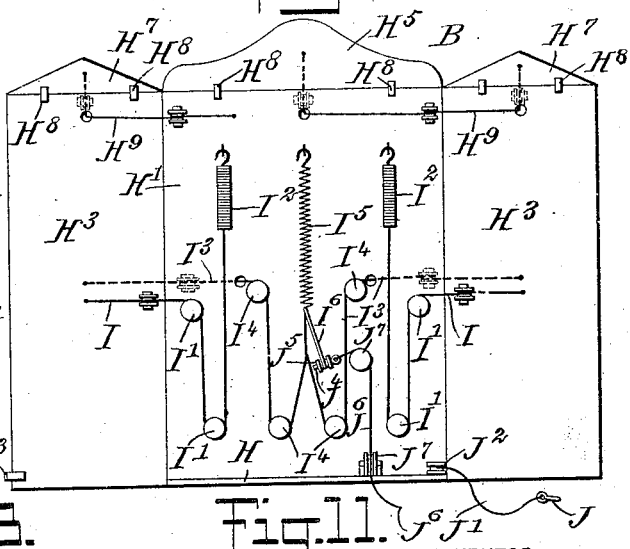

Figure 1 is a rear face view of a theatrical property in the form of an anvil. Fig. 2 is a sectional side elevation of the same. Fig. 3 is a plan view of the same. Fig. 4 is a side elevation of the same theatrical property transformed to represent a pedestal. Fig. 5 is a sectional side elevation of the same. Fig. 6 is a front face view of the theatrical property in the form of a half-barrel. Fig. 7 is a plan view of the same. Fig. 8 is a rear face view of the same. Fig. 9 is a front face view of the same theatrical property transformed into a screen. Fig. 10 is a plan view of the same. Fig. 11 is a rear face view of the same. Fig. 12 is a front face view of a theatrical property representing a barrel. Fig. 13 is an enlarged sectional side elevation of the same. Fig. 14 is a side elevation of the same property transformed into a table and vase. Fig. 15 is an enlarged plan view of the same. Fig. 16 is a front elevation of a theatrical property representing a tub. Fig. 17 is a transverse section of the same. Fig. 18 is a plan view of the same. Fig. 19 is a front elevation of the same theatrical property transformed into a chair and rug. Fig. 20 is a plan view of the same. Fig. 21 is a rear face view of the same, and Fig. 22 is a diagrammatic plan view of a scene containing the several properties and representing in the one form a cooper shop and when transformed the furniture of a room.

The stage apparatus illustrated in Fig. 22 consists of the stage properties A, B, C, and D, grouped on the stage and representing in one form the paraphernalia of a cooper shop—that is, an anvil, Fig. 1, a half-barrel, Fig. 6, a barrel, Fig. 12, and a tub, Fig. 16—and when the said properties are transformed by an operator pulling a concealed string E from the rear of the stage then the properties A, B, C, and D represent the furniture of a room—that is, a pedestal with a vase, Fig. 4, a screen, Fig. 7, a table with a vase and books thereon, Fig. 14, and a chair and rug, Fig. 19, respectively.

The stage property A thus comprises a combination anvil and pedestal supporting a vase and is capable of being transformed from an anvil into a pedestal, and vice versa. The detailed construction of this stage property A is as follows, special reference being had to Figs. 1 to 5: On a suitably-constructed base F is erected a column F′, preferably open at the rear and supporting at its upper end a polygonal frame $F^2$, representing the top of an anvil, and the upper ends of the opposite sides of the said frame $F^2$ are connected by spring-hinges $F^3$ with triangular flaps $F^4$, representing the points of the anvil, the said flaps being provided at the under sides with pieces of black cloth $F^5$, extending to the lower ends of the sides of the frame $F^2$ to give a more complete anvil appearance to the structure. On the base F is arranged a box-like structure $F^6$, connected at the upper ends of its front and sides by spring-hinges $F^7$, with flaps $F^8$ forming extensions of the box-like structure $F^6$, the latter and the extensions representing the base-block for the anvil, as will be readily understood by reference to Figs. 1, 2, and 3. Within the box-like structure $F^6$ and its extended flaps $F^8$ is normally concealed a bottomless vase G, having an outwardly-extending bottom flange G′, mounted to slide on the column F′, which when raised is adapted to inclose the frame $F^2$ and the flaps $F^4$ when the latter are folded, as will be understood by reference to Figs. 4 and 6. The vase G is hung on a plurality of ropes $G^2$, extending upwardly outside of the column F′ and passing over guide-pulleys $G^3$, journaled in the frame $F^2$, and the said ropes $G^2$ terminate in a ring $G^4$, engaged by a pin $G^5$, forming part of a trigger device, and engaging lugs $G^6$, held on the top of a weight $G^7$, arranged within the column $F'$. Normally the weight $G^7$ is held in an uppermost position by a rod $G^8$, (see Fig. 1,) connected with the weight $G^7$ and engaged at its upper end by a pin $E'$, forming part of a trigger device and slidably held in lugs $F^9$, attached to the rear of the frame $F^2$. The pin $E'$ is connected with the string E, previously mentioned, and passes through an eye $E^2$, attached to the frame $F^2$, to then extend downward into the box-like structure $F^6$, to pass through an opening $E^3$ therein to the outside and to the rear of the stage, as shown in Fig. 22. Now when the operator pulls on this string E then the trigger-pin $E'$ is withdrawn from the lugs $F^9$ and the rod $G^8$, and consequently the weight $G^7$ is released and drops down in the hollow column $F'$, thus pulling on the ropes $G^2$ to lift the vase G into an uppermost position. At the same time the flaps $F^8$ are swung downward and outward onto the outer sides of the box-like structure $F^6$, and for this purpose each flap $F^8$ is connected at its upper end with a rope $F^{10}$, passing over a guide-pulley $F^{11}$, journaled on the flap $F^8$, and then the rope $F^{10}$ passes through an aperture in the corresponding side of the box-like structure $F^6$ to the interior thereof, to then pass over an eye $F^{12}$, attached to the base F, the rope $F^{10}$ then connecting with the vase G. When the latter moves upward, a pull is exerted on the rope $F^{10}$ to swing the flaps $F^8$ downward against the outer side of the box-like structure $F^6$, as illustrated in Figs. 4 and 5. The flaps $F^4$, representing the anvil-points, are swung inward onto the top $F^{15}$ of the frame $F^2$ at the time the weight $G^7$ drops downward, and for this purpose each of the flaps $F^4$ is connected with one end of a rope $F^{13}$, extending into the frame $F^2$ and passing under guide-pulleys $F^{14}$ to connect with the ring $G^4$ the same as the ropes $G^2$. To the base-flange $G'$ is secured the upper end of a tubular fabric material $G^8$, normally folded between the flange $G'$ and the base F, (see Fig. 2,) and when the vase G slides upward, as previously explained, then the tubular fabric $G^8$ is extended and completely incloses the column $F'$. (See Figs. 4 and 5.) The top $F^{15}$ of the frame $F^2$ is preferably in the form of metallic bars, adapted to be sounded when struck with hammers or the like.

From the foregoing it will be seen that by simply pulling the rope E the stage property A is transformed from an anvil into a pedestal supporting a base.

In order to transform the pedestal and vase shown in Figs. 4 and 5 back into the anvil, it is only necessary to withdraw the trigger-pin $G^5$, and for this purpose a rope $E^4$ is connected with the trigger-pin $G^5$, and this rope extends over a pulley $E^5$, journaled in the upper end of the column $F'$. Then the rope extends downward within the column and passes over a pulley $E^6$ and finally through an opening $E^7$ in the back of the box-like structure $F^6$ to the rear of the stage. Now when the operator pulls this rope $E^4$ at the time the weight $G^7$ is in a lowermost position (shown in Fig. 5) then the pin $G^5$ is withdrawn, thus releasing the ropes $G^2$ and $F^{13}$. When this takes place, the vase G by its own weight slides down on the column $F'$, thus slackening the rope $F^{10}$ to allow the spring-hinges $F^7$ to return the flaps $F^8$ to their normal extended positions. (Shown in Figs. 1 and 2.) At the same time the ropes $F^{13}$ are slackened to allow the spring-hinges $F^3$ to return the flaps $F^4$ to their extended positions. Thus it will be seen that the vase G slides down into the box-like structure $F^6$, to be concealed therein.

It is understood that for resetting the stage property for again transforming the anvil back into the pedestal it is necessary for the operator to lift the weight $G^7$ and connect the same with the trigger-pin $E'$ and also to reinsert the trigger-pin $G^5$.

The detailed construction of the stage property B is as follows, special reference being had to Figs. 6 to 11: On a suitably-constructed base H is erected a central fold $H'$, forming part of a screen and having its sides connected by hinges $H^2$ with the side folds $H^3$, painted on their outside to represent staves and hoops of a barrel, as plainly indicated in Fig. 6, the outer faces of the folds $H^3$ being segmental, so that when the folds $H^3$ are folded into the position shown in Figs. 6 and 7 then the stage property has the appearance of a barrel when looked at from the front. When the folds $H^3$ are extended, as shown in Figs. 9 and 10, then the opposite faces are visible from the front of the stage, the folds then having the appearance of a screen. The upper end of the fold $H'$ is connected by hinges $H^4$ with the top $H^5$, and hinges $H^6$ on the upper ends of the folds $H^3$ connect with tops $H^7$ for the said folds $H^3$. Each of the folds $H^3$ is connected at its outer side with the ends of ropes I, passing over pulleys $I'$, journaled on the back of the fold $H'$, to then connect with springs $I^2$, hooked to the back of the fold $H'$. Similar ropes $I^3$ are connected at one end to the inside of the side folds $H^3$ and then extend to the back of the central fold $H'$ to pass over pulleys $I^4$, journaled on the central fold $H'$, the ropes $I^3$ then connecting with a spring $I^5$, hooked onto the back of the fold $H'$. Now when the side folds $H^3$ are in a closed position they are locked therein by a trigger-pin J, held on a rope $J'$, extending over a pulley $J^2$, arranged at one side of the central fold $H'$ and near the bottom thereof, and the said trigger-pin J engages a locking device $J^3$ for locking the side folds H³ in the closed position. (Shown in Figs. 6, 7, and 8.) A trigger-pin J⁴ engages a connection I⁶ of the spring I⁵ and also lugs J⁵, arranged on the back of the central fold H′, so as to hold the spring I⁵ in an extended position at the time the side folds H³ are extended to represent a screen. The trigger-pin J⁴ is connected to one end of a rope J⁶, passing over pulleys J⁷ to the rear of the stage, the same as the rope J′. The tops H⁵ and H⁷ for the folds H′ and H³ are connected with the latter by elastic straps H⁸, and the said tops H⁷ are also connected with elastic straps H⁹, extending to the back of the central fold H′, as will be readily understood by reference to Fig. 10. Now assuming that the several parts are in the positions illustrated in Figs. 6, 7, and 8 and it is desired to change the appearance of the property from the barrel to a screen, then it is only necessary for the operator to pull on the rope J′ to withdraw the trigger-pin J from the locking device J³ to permit the springs I² to exert a pull on the ropes I, so that the folds H³ are swung into an open position, and the said folds H³ now allow the elastic straps H⁸ to raise the tops H⁵ and H⁷. When it is desired to change the property back from the screen form into the barrel form, then it is necessary for the operator to first unhook the springs I² and then pull the rope J⁶ to withdraw the trigger-pin J⁴, thereby allowing the spring I⁵ to exert a pull on the ropes I³ to swing the side folds H³ into a closed position to represent the barrel, as previously mentioned, the elastic straps H⁹ pulling the tops H⁵ and H⁷ down into a horizontal position on the closing of the side folds H³.

The detailed construction of the stage property C is as follows, special reference being had to Figs. 12 to 15: On a suitably-constructed base K is erected a frame K′, representing in outline the lower tapering and the middle cylindrical portion of a barrel, and on the said frame K′ is mounted to slide or telescope an auxiliary frame or slide K², connected at its upper end by a fabric material K³ with the upper end of the frame K′, so that when the slide K² is extended, as shown in Figs. 12 and 13, then the fabric material K³ represents the upper tapering portion of the barrel. The slide K² is held in an extended uppermost position by a link K⁴, connected with the slide K² and engaged at its upper end by a trigger-pin K⁵, also engaging lugs K⁶, arranged on the top K⁷ of the frame K′. A rope K⁸ is connected with the trigger-pin K⁵ and extends down in the frame K′ to pass over a pulley K⁹, journaled on the base K, the rope K⁸ then extending to the outside of the stage property. A spring K¹⁰ is connected with the slide K² and also with a rope K¹¹, passing under a pulley K¹², journaled on the base K, the rope then extending upward on the outside of the frame K′ to connect with the upper end thereof at an eye or hook K¹³. When the several parts are in the position shown in Fig. 13, the slide K² is locked in an uppermost position, and when a pull is exerted on the rope K⁸ and the trigger-pin K⁵ is withdrawn, then the link K⁴ is released and the slide K² is caused to slide downward on the frame K′ by its own weight and by the action of the spring K¹⁰.

A number of table-tops L are connected at their inner ends by hinges L′ with the top K⁷ of the frame K′, and the said table-tops L are held in an inclined position by resting with their upper ends against the under side of the slide K² at the time the latter is in an extended position. On the table-tops L is secured the inner edge of a table-cover L², provided on its outer edge with a weight L³, and when the slide K² is released and moves into a telescoping position, then the table-tops L swing outward and the weight L³ drops down, so that the table-cover L² is extended down over the outside of the frame K′, as plainly shown in Fig. 13, thereby disclosing books L⁴ or other ornaments attached to the table-tops L and also a vase N or the like held centrally on the top K⁷. (See Fig. 14.)

From the foregoing it will be seen that by the arrangement described the barrel can be readily transformed into a table having a table-cover and supporting a vase N and other ornaments L⁴.

In order to permit of transforming this table back into the barrel, the following arrangement is made: Within the bottomless vase N is a weight N′, connected with ropes N², extending over pulleys N³ and attached to the outer edge of the table-cloth L². The weight N′ is normally supported on a trap-door N⁴, hinged at one end to the top K⁷ and connected at its free end by a link N⁵, engaged at its upper end by a trigger-pin N⁶, also engaging lugs or eyes N⁷, arranged in the vase N. By this arrangement the trap-door N⁴ is held in a horizontal position, thus supporting the weight N′. A rope N⁸ is connected with the trigger-pin N⁶ and extends over pulleys N⁹ N¹⁰, located in the vase N and the base K, respectively. The rope N⁸ after leaving the pulley N¹⁰ extends to the outside of the theatrical property C. On a bracket K¹⁴, attached to the base K, is hinged a trap-door O in vertical alinement with the weight N′ and connected at its free end with one end of a rope O′, extending upwardly and passing over a pulley O², arranged on the top K⁷, the upper end of the rope O′ connecting with a trigger-pin O³, engaging lugs or eyes O⁴, held on the top K⁷. A link O⁵ is hung on the trigger-pin O³ and supports a weight O⁶, connected by a normally slack rope O⁷, extending over a pulley O⁸, with the slide K². Now when the stage property represents a table and it is desired to transform the same back into a barrel it is only necessary to exert a pull on the rope $N^8$, so that the trigger-pin $N^6$ is withdrawn to release the link $N^5$ and trap-door $N^4$, and thereby allow the weight $N'$ to drop. The latter in doing so exerts a pull on the ropes $N^2$ to draw up the table-cloth $L^2$. The weight $N'$ in dropping finally engages the trap-door O and swings the same downward, so that the trap-door O by the rope $O'$ causes a withdrawal of the trigger-pin $O^3$ to release the link $O^5$ and weight $O^6$. The latter now drops and in doing so exerts a pull on the rope $O^7$, which now draws the slide $K^2$ up into its extended position, the weight $O^6$ being sufficiently heavy to overcome the spring $K^{10}$, which is thus put under tension. The slide $K^2$ in rising engages the free ends of the table-tops L, thus swinging the latter up into an inclined position. The slide $K^2$ now conceals the vase N, as well as the table-tops L and table-cloth $L^2$.

The detailed construction of the theatrical property D is as follows, special reference being had to Figs. 16 to 20: On a suitable base P are secured the legs of a chair $P'$, having a back $P^2$, connected by hinged $P^3$ with the rear of the seat of the chair $P'$, so that the back $P^2$ can be folded down upon the seat, as plainly indicated in Figs. 17 and 18. Normally the back $P^2$ is held in an extended position by the action of a rope $P^4$, attached to the back $P^2$ and extending over a pulley $P^5$, journaled on the said back, the rope then connecting with a spring $P^6$, attached to the base P. The back $P^2$ is locked in the folded position and against the tension of the spring $P^6$ by a trigger-pin Q, extending through an eye $Q'$, secured to the free end of the front R of the tub and hinged to the front end of the base P. The eye $Q'$ extends through an opening $P^7$ in the back $P^2$, and when the trigger-pin Q engages the said eye, as plainly shown in Figs. 17 and 18, then the back $P^2$ is locked in a folded position to the front R of the tub. The trigger-pin R is held on one end of a rope $Q^2$, extending through an eye $Q^3$ and over a pulley $Q^4$, both eye and pulley being held on the back $P^2$ of the chair, the rope $Q^2$ then passing under a pulley $Q^5$, journaled on the stage-floor immediately in the rear of the property D, as plainly indicated in the drawings. Now when a pull is exerted on the rope $Q^2$, then the trigger-pin Q is withdrawn from the eye $Q'$, thus freeing both the back $P^2$ and the front R of the tub to allow the spring $P^6$ to swing the back $P^2$ into the extended position and to allow the front R to swing downward in front of the chair, as plainly indicated in Fig. 20. The front R of the tub is connected at its sides by hinges $R'$ with the sides $R^2$ and $R^3$ of the tub, and the said front, as well as the sides $R^2$ and $R^3$, imitate on their outer faces staves and hoops of a tub, as indicated in Fig. 16, and on the opposite faces the said front R and the sides $R^2$ and $R^3$ are provided with rug material. Thus when the theatrical property represents a chair, then the front and sides of the tub represent a rug spread in front of the chair, as plainly indicated in Fig. 20. When the theatrical property represents a tub, then the back $P^2$ is folded and locked to the front R, as previously explained, and the sides $R^2$ and $R^3$ of the tub extend and fold against the sides of the chair $P'$. When the trigger-pin Q is withdrawn, as previously explained, then the theatrical property representing the tub is almost instantly transformed into a chair with a rug spread in front of it. In order to retransform this property into a tub, the following arrangement is made: The front R is connected at its rug side with one or more ropes $R^4$, extending under pulleys $R^5$ and up through eyes in arms $P^8$, secured to the rear face of the back $P^2$ of the chair, the ropes then being attached to the back $P^2$, as plainly shown in Figs. 18 and 21. Similar ropes $R^6$ and $R^7$ connect with the rug-faces of the sides $R^2$ and $R^3$ of the tub and extend under pulleys $R^8$ and $R^9$, held on the base P, to then pass through the eyes of the arms $P^8$, to be finally attached to the back $P^2$ of the chair. Now when the back $P^2$ is swung downward and forwardly into a folded position on top of the seat of the chair $P'$, then the arms $P^8$ exert a pull on the ropes $R^4$, $R^6$, and $R^7$ to swing the front R up against the front of the chair and to swing the sides $R^2$ and $R^3$ against the sides of the chair. After the back $P^2$ is swung downward into a folded position it is locked in place therein by inserting the trigger-pin Q into the eye $Q'$.

After the several theatrical properites A, B, C, and D are set in their proper places on the stage, as indicated in Fig. 22, then the several properties are connected with each other and with the rope E, previously mentioned, so that all the theatrical properties are controlled from a single source for almost instantly transforming the theatrical properties from one form to another. The arrangement is as follows: The rope $J'$ of the barrel and screen property B, the rope $K^8$ of the barrel and table property C, and the rope $Q^2$ of the tub and chair property D are connected with the rope E of the anvil and pedestal device A, and when the several properties are set up in the form of anvil, half-barrel, tub, and barrel and the operator pulls the rope E, then the pins $E'$, J, $K^5$, and Q of the several trigger devices are simultaneously withdrawn, so that the several properties are almost instantly transformed into a pedestal, a screen, a table with a vase, and a chair with a rug in front of it. Now for retransforming the properties it is necessary for an operator to press down the back $P^2$ of the chair and lock it in place by inserting the trigger-pin Q into the eye $P^7$, as before explained. To the back $P^2$ of the chair P is secured a rope T, which extends with the ropes $R^4$ and $R^7$ through the eye of the corresponding arm $P^8$, (see Figs. 18 and 21,) and this rope T passes under a pulley T' and connects with the rope $E^4$ of the theatrical property A and controlling the pin $G^5$ of the trigger device for releasing the ropes $G^2$ and $F^{13}$ to allow the vase G to descend and the flaps $F^4$ to swing outward, as above explained in reference to Figs. 1, 2, and 3. The rope T also connects with the rope $J^6$ of the theatrical property B and controlling the pin $J^4$ of the trigger device for releasing the spring $I^5$, as above explained with reference to Figs. 6 to 11. The rope T also connects with the rope $N^8$ of the theatrical property C and controlling the pin $N^6$ of the trigger device for releasing the trap-door $N^4$ and the weight N', as previously explained in reference to Figs. 12 to 15.

It is understood that I do not limit myself to the particular form given to the theatrical properties as shown and described, as the same may be varied without deviating from the invention.

Having thus described my invention, I claim as new and desire to secure by Letters Patent—

1. A theatrical apparatus comprising a plurality of theatrical properties, each representing a plurality of distinct articles, means for actuating the said properties from a single source for transforming the articles into another form, and means for actuating the said properties from a single source for returning them to their original form.

2. A theatrical apparatus comprising a group of theatrical properties, each representing distinct articles and capable of being transformed from one article to another, means connected with the several properties for simultaneously transforming the same, and means connected with the several properties for simultaneously returning them to their original form.

3. A theatrical apparatus comprising a group of theatrical properties, each representing distinct articles and each capable of being transformed from one article to another and without changing the positions of the properties on the stage, concealed means connected with the several properties for simultaneously transforming the same to instantly change the scene, and concealed means connected with the properties for simultaneously returning them to their original form.

4. A theatrical apparatus comprising a group of theatrical properties, each representing an article belonging to a cooper-shop, and a piece of furniture for a room, means for transforming the said properties in unison from one form to the other form, and means for returning them in unison to their original form.

5. A theatrical apparatus comprising the following theatrical properties, namely; a combination barrel and screen, a combination anvil and pedestal, a combination tub and chair, and a combination barrel and table, means for simultaneously transforming the articles from the one form to the other form, and means for simultaneously returning them to their original form.

6. A theatrical apparatus comprising a group of theatrical properties, each representing an article belonging to a cooper-shop, and a piece of furniture for a room, means for transforming the said properties in unison from the one form to the other form, and means for returning them in unison to their original form, each of said means being manually controlled from a common source.

7. A theatrical apparatus comprising a group of theatrical properties, each representing an article belonging to a cooper-shop and a piece of furniture for a room, means for simultaneously transforming the said properties from the one form to the other, and means for simultaneously returning them to their original form, the said properties remaining in their relative positions on the stage during the transformation and the return to their original position.

In testimony whereof I have signed my name to this specification in the presence of two subscribing witnesses.

RICHARD FELIX STALEY.

Witnesses:
 THEO. G. HOSTER,
 EVERARD B. MARSHALL.